C. W. DAKE.
MOTOR GENERATOR SET.
APPLICATION FILED JUNE 17, 1912.
1,145,565.
Patented July 6, 1915.
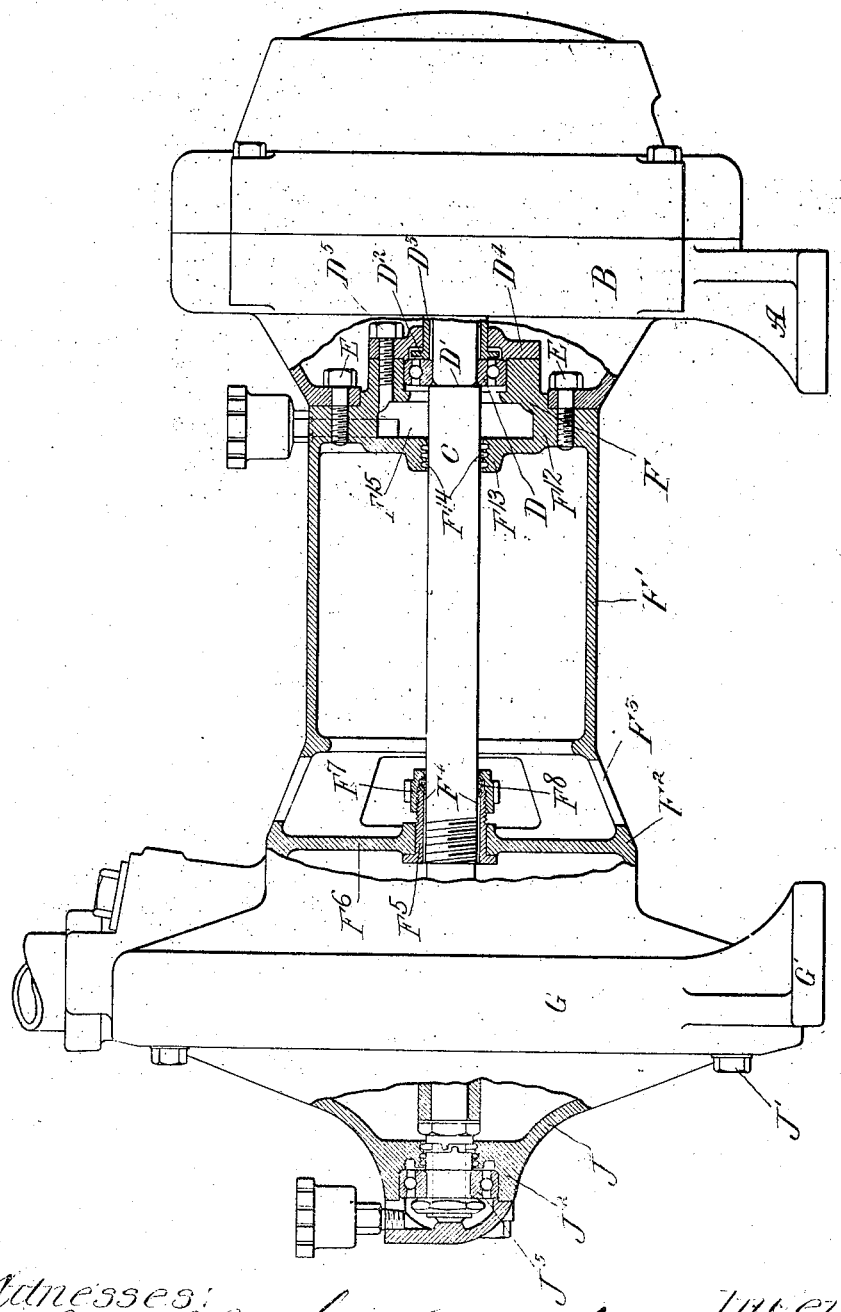

UNITED STATES PATENT OFFICE.

CHARLES W. DAKE, OF CHICAGO, ILLINOIS, ASSIGNOR TO PYLE-NATIONAL ELECTRIC HEADLIGHT COMPANY, OF CHICAGO, ILLINOIS, A CORPORATION OF NEW JERSEY.

MOTOR-GENERATOR SET.

1,145,565.     Specification of Letters Patent.     Patented July 6, 1915.

Application filed June 17, 1912. Serial No. 704,015.

*To all whom it may concern:*

Be it known that I, CHARLES W. DAKE, a citizen of the United States, residing at Chicago, in the county of Cook and State of Illinois, have invented a certain new and useful Improvement in Motor - Generator Sets, of which the following is a specification.

My invention relates to motor generator sets and is illustrated in the accompanying drawing wherein the drawing represents a motor generator set in elevation, parts being shown in longitudinal section.

A is a base and standard on which is mounted the two part generator casing B into which projects one end of the shaft C on which is mounted within the casing the generator armature. The shaft C is provided with a bearing beyond which its end projects into the generator case. This bearing consists of the ball bearing structure D held in position against the shoulder $D^1$ on the shaft and between the flange $D^2$ of the sleeve $D^3$ which surrounds the shaft. This flange $D^2$ is held in position by the cap $D^4$ secured by the cap screws $D^5$ to the end plate F.

The cylindrical housing $F^1$ carries at one end the inwardly projecting flange $F^{12}$ which flange carries the collar F projecting outwardly from the end of the housing and the collar $F^{13}$ located behind the collar F. The collar $F^{13}$ is, of course, perforated as indicated, the perforation being of such diameter as to permit the passage of the shaft C. The wall of the perforation in opposition to the shaft C consists of the oil retaining grooves $F^{14}$ forming in effect a stuffing box to prevent or minimize the discharge of grease out of the grease chamber $F^{15}$. The conical extension or enlargement $F^2$ which connects the sleeve $F^1$ and the motor casing G is integral with each of them but apertured at $F^3$ to provide access for the stuffing box $F^4$ made up of the sleeve $F^5$ located in the diaphragm $F^6$ and the screw-threaded nut or collar $F^7$ screw-threaded on the end of the sleeve and compressing and packing the material $F^8$ against the shaft. The diaphragm $F^6$ forms a portion of one of the side walls of the motor casing G.

G is the motor casing also integral with the shaft casing and provided with the base and standard $G^1$ on which it is mounted. It contains the motor which in the preferred form of my device is a steam turbine. Beyond the motor casing is a bearing casing J secured to the motor casing by the cap screws $J^1$ $J^1$ and provided with the housing $J^2$ in which the other bearing $J^3$ of the shaft C is located.

The parts can be easily assembled or disassembled and this is effected without disturbing their relations or the arrangement of their several parts.

I claim:

A motor generator set comprising a motor housing and a generator housing, a sleeve integral with the motor housing abutting against the side of the generator housing and means for holding the sleeve and generator housing in fixed relation one with the other, a bearing in the side wall of the motor housing farthest removed from the generator housing, a bearing in the side wall of the generator housing adjacent the motor housing, a shaft mounted on said bearings, an apertured dividing wall interposed between the motor and generator, a packing gland in said aperture surrounding said shaft, an apertured wall at the end of the sleeve adjacent the generator housing and a grease pocket contained within said apertured wall and in communication with the bearing in the generator housing wall and grease retaining rings on the wall of the aperture in the end of the sleeve surrounding the shaft.

Signed at Chicago, Illinois, this 10th day of June, 1912.

CHARLES W. DAKE.

Witnesses:
    FRANCIS W. PARKER, Jr.,
    LAUREL M. DOREMUS.